(12) United States Patent
Appel

(10) Patent No.: US 9,067,292 B2
(45) Date of Patent: Jun. 30, 2015

(54) VACUUM DEVICE

(71) Applicant: Hilti Aktiengesellschaft, Schaan (LI)

(72) Inventor: Hans Appel, Munich (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 280 days.

(21) Appl. No.: 13/686,357

(22) Filed: Nov. 27, 2012

(65) Prior Publication Data
US 2013/0149056 A1 Jun. 13, 2013

(30) Foreign Application Priority Data
Nov. 29, 2011 (DE) .......................... 10 2011 087 360

(51) Int. Cl.
*B23B 47/34* (2006.01)
*B23Q 11/00* (2006.01)

(52) U.S. Cl.
CPC ............ *B23Q 11/0071* (2013.01); *B23B 47/34* (2013.01); *B23Q 11/0046* (2013.01); *Y10T 408/44* (2015.01); *Y10T 408/453* (2015.01); *Y10T 408/50* (2015.01)

(58) Field of Classification Search
CPC ............ B23B 2270/30; B23B 2270/62; B23B 2260/058; B23B 47/34; B23Q 11/0046; B23Q 11/0071; B23C 2230/00
USPC ................................ 408/67, 56, 58
See application file for complete search history.

(56) References Cited

U.S. PATENT DOCUMENTS

| | | | | |
|---|---|---|---|---|
| 3,850,254 | A * | 11/1974 | Hirdes ............................ | 173/75 |
| 4,209,069 | A * | 6/1980 | Smith ............................. | 173/75 |
| 5,467,835 | A * | 11/1995 | Obermeier et al. ........... | 175/209 |
| 6,065,908 | A * | 5/2000 | Kleine et al. .................... | 408/67 |
| 6,851,898 | B2 * | 2/2005 | Ege et al. ........................ | 408/67 |
| 6,951,439 | B2 * | 10/2005 | Arich .............................. | 408/67 |
| 7,017,680 | B2 * | 3/2006 | Arich et al. ................... | 173/198 |
| 7,354,226 | B2 * | 4/2008 | Britz .............................. | 408/67 |
| 2002/0141836 | A1 * | 10/2002 | Ege et al. ........................ | 408/67 |
| 2005/0281627 | A1 * | 12/2005 | Britz .............................. | 408/67 |
| 2008/0202781 | A1 * | 8/2008 | Nishikawa et al. ........... | 173/104 |
| 2009/0148246 | A1 * | 6/2009 | Nishikawa et al. ............. | 408/58 |
| 2011/0226499 | A1 * | 9/2011 | Kakiuchi et al. ................ | 173/75 |

* cited by examiner

*Primary Examiner* — Daniel Howell
*Assistant Examiner* — Nicole N Ramos
(74) *Attorney, Agent, or Firm* — McAndrews, Held & Malloy, Ltd.

(57) ABSTRACT

A vacuum device for a drilling hand tool includes a housing, a connection piece, a blower, and a collecting vessel. A drilling tool can be plugged into and through the connection device along a working axis. The blower conveys dust-laden air from the connection piece into the collecting vessel. The connection vessel includes a tray cartridge which can be removed from the housing, and a locking bar. The locking bar is hinged on the tray cartridge or on the housing and can pivot between a locking position and an unlocked position. When the locking bar is in the locking position, it presses the tray cartridge against the housing to provide pretensioning.

19 Claims, 8 Drawing Sheets

VACUUM DEVICE

CROSS-REFERENCE TO RELATED APPLICATIONS

The present application claims priority to German Patent Application DE 102011087360.0, filed Nov. 29, 2011, and entitled "Absaugvorrichtung" ("Vacuum Device"), which is hereby incorporated by reference in its entirety

BACKGROUND OF THE INVENTION

Some embodiments of the present invention relate to a vacuum device for a hand tool, such as a drilling device having a drill bit. Additionally, some embodiments of the present invention relate to a method for controlling a vacuum device for a hand tool, such as a drilling device.

SUMMARY OF THE INVENTION

According to at least one embodiment of the present invention, a vacuum device for a drilling hand tool includes a housing, a connection piece, a blower, and a collecting vessel. A drilling tool can be connected to the vacuum device via the connection piece. In some embodiments, the connection piece is configured so that a drilling tool can be plugged into and through the connection device along a working axis. The blower conveys dust-laden air from the connection piece into the collecting vessel. The connection vessel includes a tray cartridge which can be removed from the housing, and a locking bar. The locking bar is hinged on the tray cartridge or on the housing and can pivot between a locking position and an unlocked position. When the locking bar is in the locking position, it presses the tray cartridge against the housing to provide pretensioning.

According to at least one embodiment, the tray cartridge has a tray basin and a pivotable lid. According to some aspects, the lid closes the tray basin in a direction opposite the direction of removal. The lid can be located on the side of the tray basin which faces the housing, such that the lid closes the tray basin when the tray cartridge is attached. In some embodiments, the tray basin remains closed by the lid when the user removes the tray cartridge. In some embodiments, the lid can be curved in the direction opposite the direction of removal, and can contribute to the volume of the collecting vessel.

According to at least one embodiment, a seal is arranged between the housing and the tray cartridge. The seal reduces a drop in pressure from the blower to the connection piece. In some embodiments, the seal has two seal rings arranged with a displacement from each other along an air stream through the tray cartridge. In some embodiments, the seal rings each circularly enclose the air stream. Further, in some embodiments, a first seal ring encircles an air filter, and a second seal ring encircles the lid.

BRIEF DESCRIPTION OF THE DRAWINGS

In the following, exemplary embodiments of the invention are described in greater detail with reference to the attached drawings, wherein.

Identical or functionally identical elements are indicated by the same reference numbers in the figures, unless otherwise noted.

EMBODIMENTS OF THE INVENTION

Figure 1:
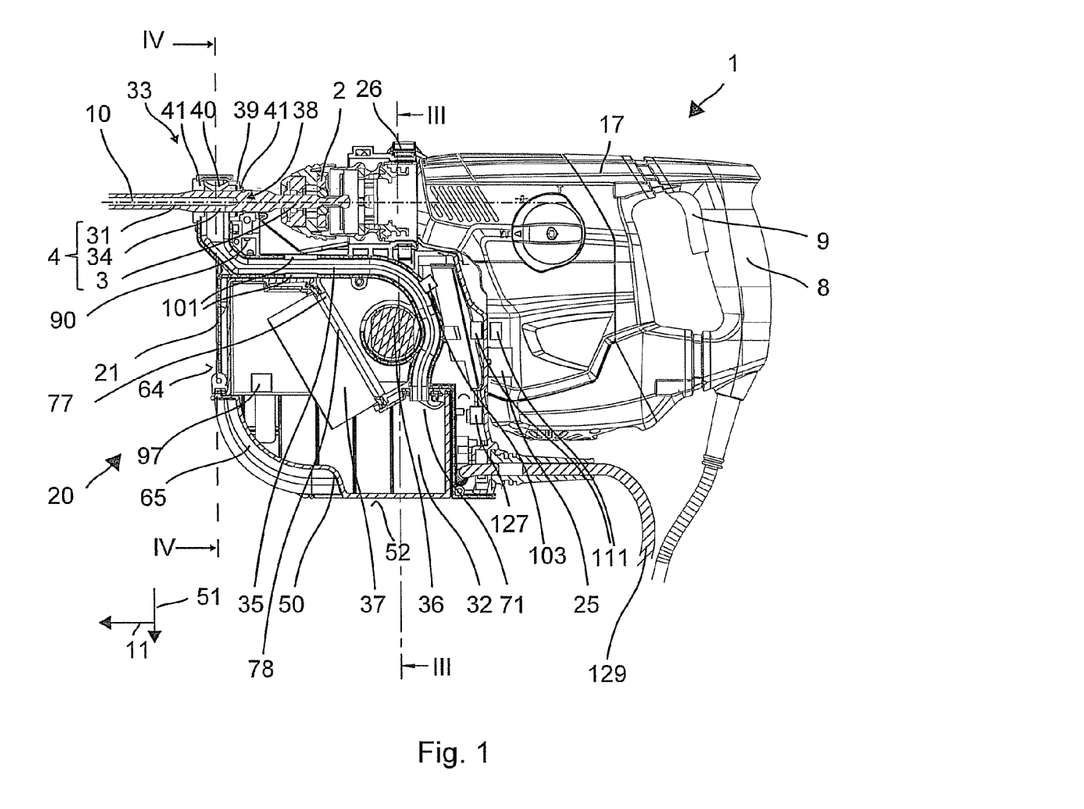
FIG. 1 shows a percussion drill and a vacuum device.

Some embodiments of the present invention relate to a vacuum device 20 for a hand tool. In this regard, FIG. 1 shows the vacuum device 20 interconnected with a hand tool in the form of a precision drill 1. The precision drill 1 is provided as one example of a hand tool that can be used with the vacuum device 20.

Figure 2:
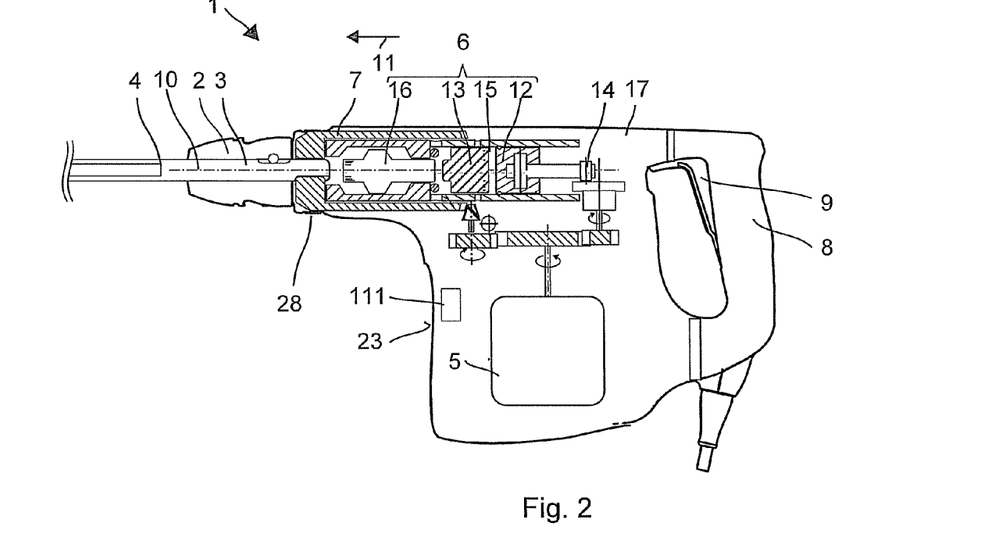
FIG. 2 shows a schematic construction of a percussion drill.

FIG. 2 shows the percussion drill 1 in greater detail. The percussion drill 1 has a tool chuck 2 into which a shank 3 of a drill bit, for example of a hollow drill bit 4, can be inserted. A rotating drive motor 5, such as an electric motor, forms a primary drive of the percussion drill 1. In this regard, the drive motor 5 drives a hammer mechanism 6 and a drive shaft 7. A user can guide the percussion drill 1 using a hand grip 8, and can operate the percussion drill 1 via a system switch 9. During operation, the percussion drill 1 continuously rotates the hollow drill bit 4 about a working axis 10, and at the same time can strike the hollow drill bit 4 into a substrate in the striking direction 11 along the working axis 10.

The hammer mechanism 6 is a pneumatic hammer mechanism 6, for example. An exciter 12 and a hammer 13 are guided movably in the hammer mechanism 6 along the working axis 10. The exciter 12 is coupled to the drive motor 5 via an excentric 14 or a wobbling finger, and forced into a periodic, linear movement. An air spring formed by a pneumatic chamber 15 between the exciter 12 and the hammer 13 couples a movement of the hammer 13 to the movement of the exciter 12. The hammer 13 can directly strike the rear end of the hollow drill bit 4 or indirectly transmit a part of its impulse to the hollow drill bit 4 via an intermediate hammer 16 which is substantially stationary. The hammer mechanism 6 and the additional drive components can be arranged inside a tool housing 17.

The vacuum device 20 includes housing 21 which is separate from the tool housing 17 of the percussion drill 1. The back side 22 of the vacuum device 20 housing 21 preferably abuts a front side 23 of the percussion drill 1 in the direction opposite the striking direction 11. This abutment can be realized by a concave bar 24 on the rear side 22, for example. Two flanks 25 of the bar 24 grip around the percussion drill 1 on the side surfaces thereof. The bar 24 can be shaped to give a positive fit to the front side 23 of the percussion drill 1.

Figure 5:
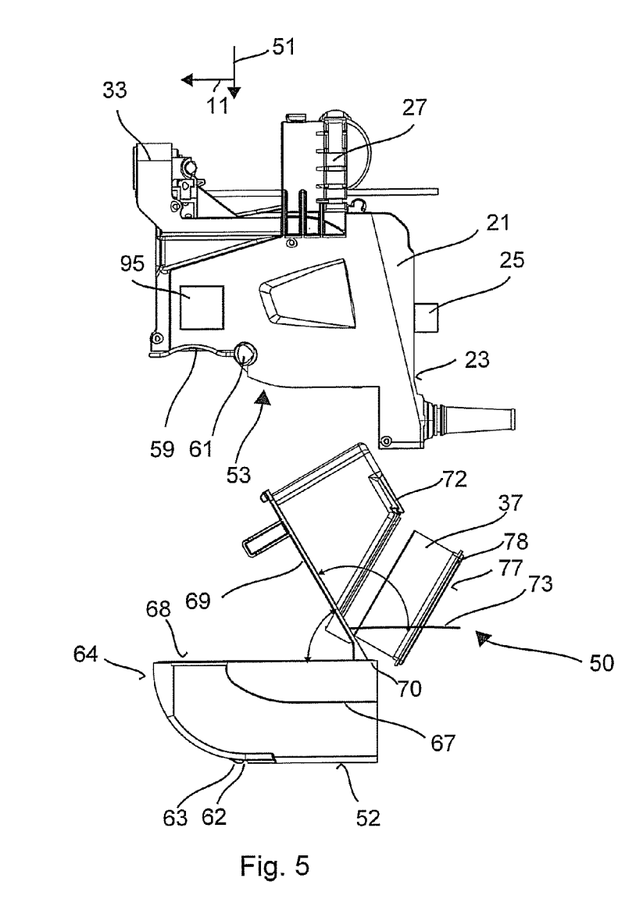
FIGS. 5 and 6 show a vacuum device which has been removed and opened.
Figure 6:
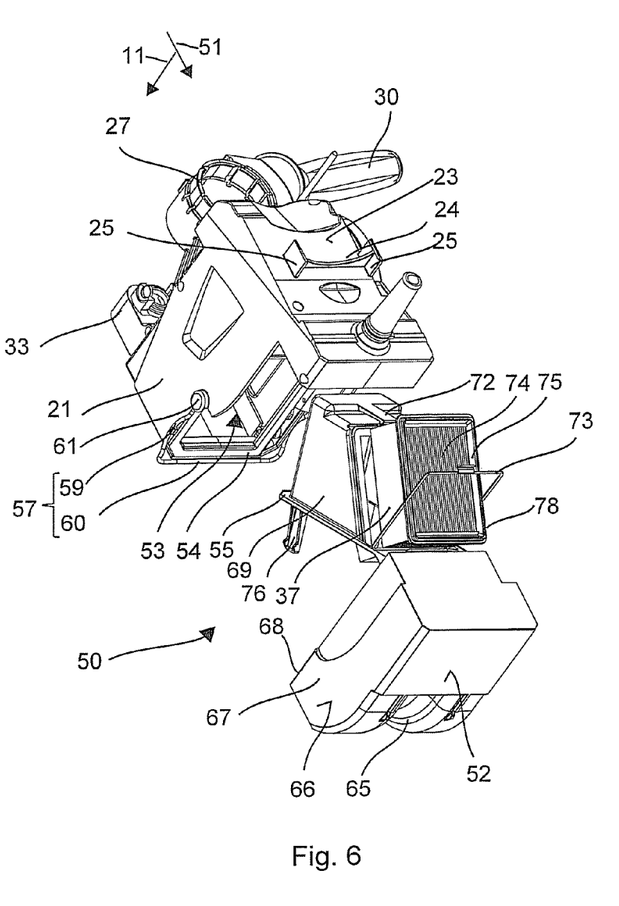

A locking bar 26 enables a user to attach the vacuum device 20 to the percussion drill 1 in a detachable manner, and/or to remove the vacuum device. In this regard, FIG. 1 shows the vacuum device 20 in the attached position and locked to the percussion drill 1, while FIGS. 5 and 6 show the vacuum device 20 removed from the percussion drill 1 and opened for the purpose of emptying borehole cuttings. The locking bar 26 includes, by way of example, a ring 27 which can surround a neck 28 of the percussion drill 1. The ring 27 can include its own clamping mechanism in the form of springs, screw clamps, etc. In the exemplary embodiment, the ring 27 has multiple slits. A tensioning strap 29 of a side hand grip 30 can surround and compress the ring 27, and therefore clamp onto the neck 28. The locking bar 26 can also include pins and/or eyelets on the rear side 22 which surround complementary counter pieces on the percussion drill 1.

Figure 3:
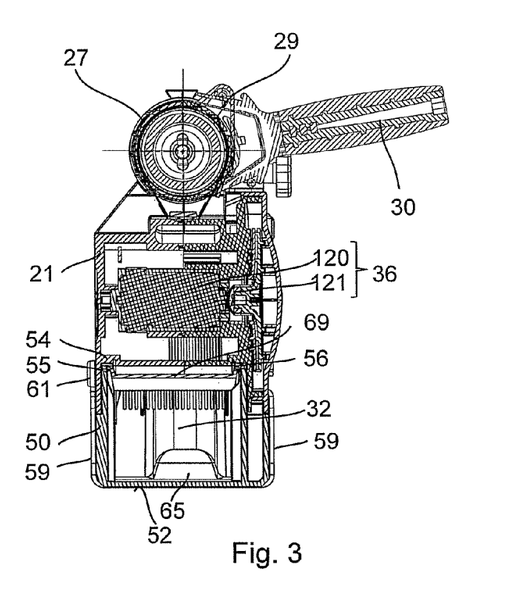
FIG. 3 shows a cutaway of the vacuum device along the plane III-III in FIG. 1.

The vacuum device 20 vacuums drill cuttings from the hollow shaft 31 of the hollow drill bit 4 into a collecting vessel 32 of the vacuum device 20. A vacuum connection piece 33 circularly encloses a vacuum opening 34 of the hollow drill bit 4. An air channel 35 leads from the vacuum connection piece 33 to the collecting vessel 32 in the housing 21. A blower 36 is arranged behind the collecting vessel 32 in the direction of flow. An air filter 37 between the blower 36 and the collecting vessel 32 functions to separate out dust particles before the collecting vessel 32.

Figure 4:
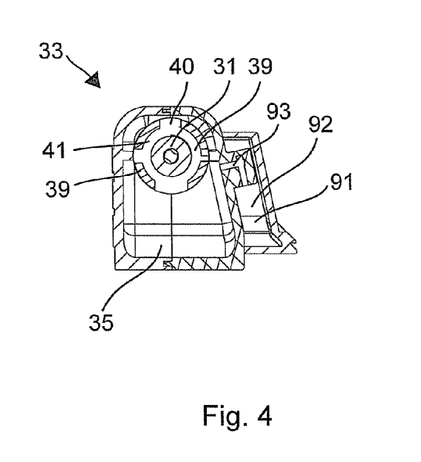
FIG. 4 shows a cutaway of the vacuum device along the plane IV-IV in FIG. 1.

The vacuum connection piece 33 may be adapted to the construction of the hollow drill bit 4. The positioning is carried out by attaching the vacuum device 20 to the percussion drill 1. The vacuum connection piece 33 has a fixed position along the working axis 10 with respect to the tool chuck 2. In particular, the position of the vacuum connection piece 33 does not change during the drilling of a hole. An opening passage 38 which is coaxial with the working axis 10 is lined by a cylindrical sleeve 39, for example, inside the vacuum connection piece 33. The vacuum connection piece 33 is hollow on the inside, and surrounds the sleeve 39. The sleeve 39 may have an internal diameter in an axially central region thereof which is larger than the diameter of the hollow drill bit 4 at the vacuum opening 34. Axial end pieces 40 of the sleeve 39 may have a smaller internal diameter compared to the central region. In some embodiments, the internal diameter of the sleeve may be constructed with a play of approximately 1 mm to 2 mm from the hollow drill bit 4. The hollow drill bit 4 is guided through the sleeve 39 without contact. One or more radial openings 41 may penetrate the sleeve 39. A length of the sleeve 39, meaning its dimension along the working axis 10, may be somewhat larger than an axial degree of freedom of the largest hollow drill bit 4 in the tool chuck 2, for example between 2 cm and 3 cm.

The rigid air channel 35 connects directly to the vacuum connection piece 33 and runs to the collecting vessel 32, and is closed along the length thereof. In some embodiments the air channel 35 may be closed over its entire length and only open to the vacuum connection piece 33 and the connecting vessel 32. Is some embodiments, the cross section of the air channel 35 is constant over the length thereof.

The collecting vessel 32 has an insertable tray cartridge 50 which can be removed from the housing 21. The tray cartridge 50 can be taken out in a removal direction 51. The removal direction 51 may be downward, meaning radially away from the working axis 10, for example. A lower side 52 of the housing 21 forms the tray cartridge 50. When removed, the tray cartridge 50 leaves an opening 53 of the housing 21 clear. The tray cartridge 50 is designed as complementary to the opening 53. When the cartridge 50 is inserted, it closes the opening 53 in an airtight and dust-tight manner. In some embodiments a seal is formed by, among other things, a seam 54 of the housing 21, which surrounds the opening 53 in a ring. The seam 54 may lie in a plane which is perpendicular to the removal direction 51, for example. The tray cartridge 50 has a seam 55 which is complementary to the seam 54. The seam 54 of the tray cartridge 50 abuts the seam 55 of the housing 21 when the tray cartridge 50 is inserted. The seam 54 of the housing 21 or the seam 55 of the tray cartridge 50 may include a sealing ring 56 made of elastic material, for example rubber or foam.

A pivotable locking bar 57 is hinged on the housing 21. The locking bar 57 can pivot from an unlocked position, in a pivot direction 58, into a locking position. The locked position is illustrated in FIG. 3, and the unlocked position is illustrated in FIG. 5. In the illustrated embodiment, the locking bar 57 has two lateral arms 59 and a cross bar 60 which connects the arms 59. The arms 59 are hinged on the housing 21 on pivot bearings 61. When in the locking position, the locking bar 57 and its cross bar 60 engage behind the underside 52 of the tray cartridge 50. In the locked position, the arms 59 are predominantly oriented parallel to the removal direction 51. The dimensioning of the arms 59 is such that the cross bar 60 of the locking bar 57 presses the tray cartridge 50 against the housing 21 when in the locking position. The exemplary locking bar 57 is partially elastic, for example made of steel. A curved, for example bent, profile of the arms 59 enables an elastic stretching of the arms 59 while applying an opposing force. The locking bar 57 therefore presses the tray cartridge 50 in the locked position against the housing 21 in a direction opposite the removal direction 51. The seal 56 is squeezed in the locked position by the pretensioning. The seal 56 can be formed of an elastic material, for example rubber, which generates a pretensioning in the locked position alternatively or additionally to the locking bar 57 functioning as a spring.

The tray cartridge 50 may include a catch mechanism 62 on its underside 52 to holds the locking bar 57 in the locked position. A local, triangularly shaped projection 63 may be situated on the underside 52 of the tray cartridge 50. Via this projection 63, the locking bar 57, and particularly the cross bar 60, is pushed upon locking. In this way, a latching of the locking bar 57 occurs in the locked position.

The underside 52 of the tray cartridge 50 may include a groove 65 running to the front side 64. The groove 65 may run over the entire pivot path of the locking bar 57, meaning from the locked position to the unlocked position, for the removal of the tray cartridge 50. A user can grip the locking bar 57 in the groove 65 from behind to pivot it.

As will be appreciated, the structure of the locking bar can take numerous different forms. For example, in some embodiments the locking bar 57 can have only one arm and a hook which grips the tray cartridge from below. An alternative embodiment includes laterally projecting pins on side surfaces 66 of the tray cartridge 50. The locking bars 57 grip these pins from behind.

In some embodiments, the tray cartridge 50 can be pulled out to one side, meaning tangentially to the working axis 10. The locking bar 57 is accordingly arranged about the working axis 10 in a pivotable manner, and grips the side of the tray cartridge 50 from behind when in the locked position.

The tray cartridge 50 has a tray basin 67 which includes a pivotable lid 69 on an upper side 68. The upper side 68, in contrast, has the removal device 51. The upper side 68 abuts the housing 21 when the tray cartridge 50 is inserted, and the lid 69 is held closed as a result. In some embodiments the pivotable lid 69 only covers a portion, such as one half, of the upper side 68, while the remaining part of the upper side 68 is closed by a rigid, non-removable lid 70. The air filter 37 is arranged in the pivotable lid 69. The unmovable lid 70 includes an opening 71 through which the air channel 35 opens into the tray cartridge 50.

When the air filter 37 becomes contaminated it can be removed from the lid 69 and replaced with a new air filter. The air filter 37 is inserted into a holder 72. A lockable and pivotable bracket 73 clamps the air filter 37 in the holder 72.

In some embodiments the holder 72 orients the air filter 37 at an incline with respect to the removal device 51. In some embodiments the holder 72 orients the air filter 37 at an incline of between about 30 degrees and about 60 degrees with respect to the removal device 51. The air filter 37 may, for example, be a laminar filter, wherein the folded sheets 74 thereof are tensioned in a frame 75.

In some embodiments the air filter 37 abuts an opening of the housing 21 when the tray cartridge 50 is inserted. This opening may be the same size as the front surface 77 of the air filter 37. In some embodiments, a sealing lip 78, which closes the front surface 77 around the periphery thereof, seals the air filter 37 against the housing 21 when the tray cartridge 50 is inserted. The sealing lip 78 may be compressed by the locked locking bar 57. The tray cartridge 50 may contact the housing 21 with two separate seals 56, 78. In a projection along the plane which is perpendicular to the removal direction 51, the sealing lip 78 lies inside the sealing ring 56. The sealing ring 56 may be arranged displaced with respect to the sealing lip 78 along an air stream through the tray cartridge 50. Both seals surround the air stream around the periphery thereof.

In at least some embodiments the lid 69 defines a portion of the volume of the collecting vessel. 69. For example, in some embodiments the lid 69 defines between about 20% and about 40% of the volume of the collecting vessel 32. The lid 69 may have a prismatic shape, for example, which is open facing the tray basin 67. The lid 69 may curve away from the tray basin 67, meaning in the direction opposite the removal direction 51. The lid may also include a seam-like edge 55 which abuts the tray basin 67 when the tray cartridge 50 is closed. One or more locking lugs 76 on the lid 69 or the tray basin 67 can hold the same together.

Figure 7:
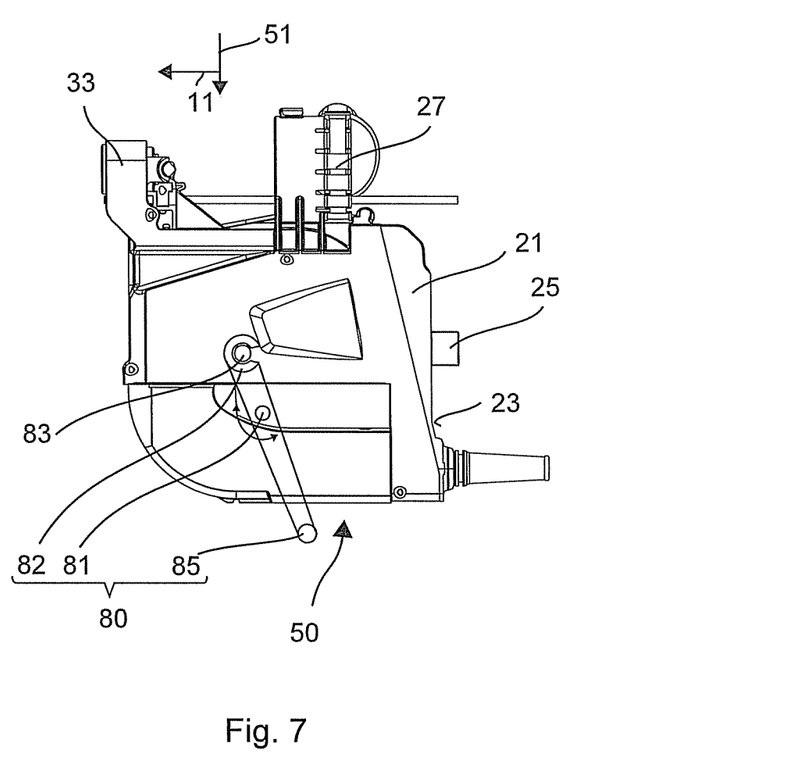
FIG. 7 shows an alternative locking of a tray cartridge.

According to at least one alternative embodiment, a locking bar 80 is pivotably mounted (FIG. 7) via a pivot bearing 81 on the side surfaces 67 of the tray cartridge 50. The locking bar 80 has a hook 82 engages with a pin 83 on the housing 21 from behind in order to lock the tray cartridge in place. The hook 82 may be curved on its front end, with respect to the pivot direction 84, in the direction facing the pivot bearing 81. The minimal separation distance of the front end results in the hook 82 locking onto the pin 83. A cross bar 85 can connect to two locking bars 80. The separation distance between the pivot bearing 81 and the hook 82 may be relatively shorter than a separation distance of the pivot bearing 81 from the pin 83 when the tray cartridge 50 is lying against the housing 21 without pressure. The relatively shortened separation distance results in a pretensioning of the tray cartridge 50 against the housing 21 when the locking bar 80 is locked in place.

A monitoring device 90 (see, e.g., FIG. 1) checks the proper functioning of the vacuum device 20. As can best be seen in FIG. 4, a pressure sensor 91 is arranged in the vacuum connection piece 33. In some embodiments, the pressure sensor 91 detects a pressure difference between the interior of the sleeve 39 and the surrounding pressure. For example, the pressure sensor 91 may be constructed as a membrane sensor or piezoresistive pressure sensor. In some embodiments, the pressure sensor 91 may be positioned in a chamber 92, which is displaced with respect to the sleeve 39 and the air channel 35. In some embodiments, the chamber 92 only has a single opening that is connected via a channel 93 to the air channel 35, relatively near to the sleeve 39, for example at a distance on the order of less than 2 cm. An exchange of air between the chamber 93 and the air channel 35 is therefore very minimal. In addition, the channel 93 can have a significantly smaller cross section than the air channel 35. In one embodiment, the pressure sensor 91 is designed to determine the absolute air pressure in the chamber 93. As an alternative, a pressure relative to the surroundings can be determined by the pressure sensor 91. The pressure sensor 91 can close off a further opening of the chamber to the surroundings, for this purpose, in order for the reference pressure to be applied to the pressure sensor 91.

According to some embodiments, the pressure inside the sleeve 39 and/or the vacuum connection piece 33 is on the order of at least 12 mBar lower than the surrounding pressure. In some embodiments the threshold for the pressure difference can be in the range between about 10 mBar and 20 mBar. If the pressure difference drops below the threshold, a malfunction can be signaled to the user; for example, an acoustic signal generator 94 or a signal light 95 is activated. According to some embodiments, the monitoring device 90 only indicates a malfunction if the low pressure difference occurs when the blower 36 is running, and occurs for a minimum duration. For example, the monitoring device 90 can be activated and deactivated together with the blower 36. In some embodiments, the deactivated monitoring device 90 does not detect a new malfunction, but rather can continue to display a previously detected malfunction, for example. The error signal can be stored in a data storage device 96 (see FIG. 8) for this purpose. In addition, during a subsequent startup of the data storage device 96, data can be read out, and the malfunction can optionally be displayed again. In some embodiments, the monitoring device 90 is reset by the removal of the collecting vessel 32, for example. In some embodiments, resetting the monitoring device 90 causes the error signal is deleted and the signal light 95 is switched off. A sensor 97 (see FIG. 1), for example an electronic sensing device, can be used to detect the removal of the collecting vessel 32.

An additional pressure sensor 98 (see, e.g., FIG. 8) can be arranged inside the air channel 35, for example on the end of the air channel 35 near to the collecting vessel 32. In some embodiments, the threshold value for the pressure sensor 98 is set higher than that of the sensor 91. For example, in some embodiments the threshold for the pressure sensor 98 is on the order of about 25 mBar to about 35 mBar.

Figure 8:
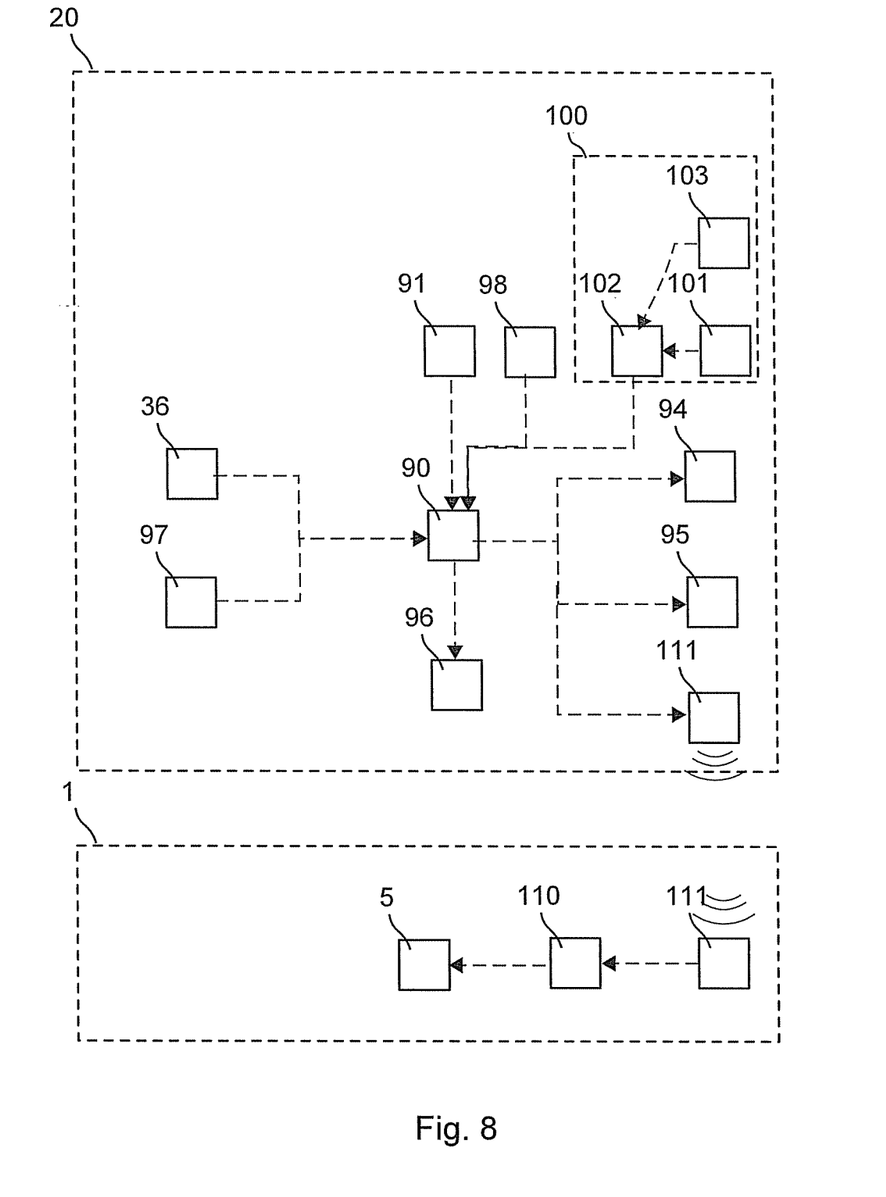
FIG. 8 shows a block diagram of a monitoring device.

With reference to FIG. 8, a capacitive sensor 100 is arranged on the air channel 35. The sensor 100 can include two plate electrodes 101 which lie opposite each other, for example, and which are insulated from each other by the air channel 35. An evaluating device 102 detects the electrical capacitance between the electrodes 101. The evaluating device 102 contains an electrical oscillation circuit, and the resonance frequency thereof is determined by the capacitance. A frequency sampling of the oscillating circuit delivers a parameter for the capacitance. The capacitance itself is utilized to determine the dust content in the intake air. The evaluation device 102 compares the dust content to a threshold. If the dust content exceeds the threshold, the user is warned of a clog in the hollow drill bit 4. The evaluation device 102 can activate the acoustic or visual signal generator 94, 95 of the monitoring device 90, for example. A piezoelectric sensor 103 can be arranged on a curved segment of the air channel 35, for example. The heavier dust particles impact the sensor 103. A rate of the impacts is a measure for the transport of dust which can be related to the evaluation device 102. The evaluation device 102 can be realized as a microprocessor or as an analog circuit.

In at least one embodiment, the monitoring device 90 communicates with the percussion drill 1. The percussion drill 1 has an automatic switch-off device 110 which deactivates the drive motor 5 in response to an error signal of the monitoring device 90, or reduces the drilling rate by means of reducing a rotation speed of the drive motor in response to the evaluation device 102. In some embodiments, the communication takes place wirelessly, for example via an inductive transmitter 111 which is arranged on the segments of the housings 17, 21 which contact each other.

Figure 9:
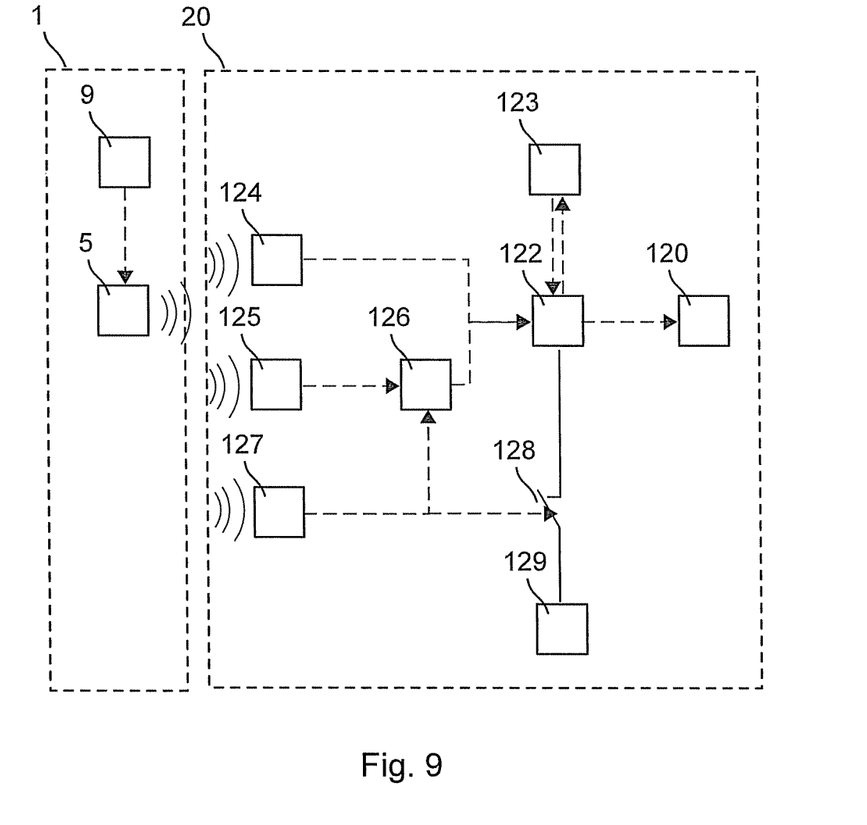
FIG. 9 shows a block diagram for an automatic activation of the vacuum device.

The blower 36 has a fan motor 120, such as an electric motor, and a fan wheel 121. The fan motor 120 drives the fan wheel 121, and the latter sucks in air through the air filter 37 and the air channel 35. A control device 122 of the vacuum device 20 activates the fan motor 120 if a user starts the operation of the percussion drill 1 by means of the system switch 9. The control device 122 further switches off the vacuum device 20 if the user stops the operation of the percussion drill 1. The shutdown can be delayed by the control device 122 initially activating a timer 123 when the user switches off the percussion drill 1. Following the expiration of a time span prespecified by the timer 123, the control device 122 switches off the vacuum device 20. In some embodiments, the time span is in the range from 2 seconds to 20 seconds, for example. The time span turns out to be sufficient to suck out remaining dust from the hollow tube of the hollow drill bit. A longer time span generally leads to a better result, because the user can remove the hollow drill bit from the drilled hole during this time, and remaining dust is removed from the hollow tube.

In some embodiments, the control device 122 of the blower 36 may be connected to a sensor 124 which detects the static magnetic field generated by the drive motor 5. The drive motor 5 may be a universal motor which, without permanent magnets, generates no magnetic field when stationary, and generates a magnetic field during operation due to the current flowing through the magnet coils. The sensor 124 may be a reed switch, for example, which responds to the magnetic field strength. According to one embodiment, the sensor 124 switches between two discrete states, wherein one state is assigned to an absent or weak magnetic field of the stationary drive motor 5, and another state is assigned to the strong magnetic field of the rotating drive motor 5. A threshold value for the magnetic field can be preset by the mechanical construction of the reed switch. According to at least one alternative embodiment, a Hall effect sensor is used as the sensor 124, wherein the output signal thereof is a measure for the magnetic field strength. The control 122 detects the output signal transmitted to it by means of a threshold value. The vacuum device 20 is typically adapted to one or a few models of percussion drill 1 or other hand tools, due to its mechanical locking bar 26. The reed sensor and/or the threshold in the vacuum device 20 are adapted for the specific model types and the drive motors 5 contained therein. Model types having a direct current motor contain permanent magnets which also generate a magnetic field when the drive motor 5 is stationary. The rotating device motor 5 has a stronger magnetic field. Both magnetic field strengths are characteristic for one model type, and the threshold is a value between the magnetic field strengths.

A further embodiment uses a sensor 125 which responds to the varying magnetic field of the drive motor 5. The drive motor 5, when stationary, does not produce a varying field, but rather generates potentially only a static magnetic field. The sensor 125 may be a Hall effect sensor, for example, which detects the strength of the magnetic field or a signal which is proportional to the magnetic field strength. A high-pass filter 126, with a cutoff frequency of 500 Hz, for example, filters out low-frequency signal components. The emitted varying fields which are characteristic for the rotation of the drive motor 5 are above 2000 Hz in the case of the drive motors used. In some embodiments, the filtered signal associated with a stationary drive motor 5 is approximately zero, independently of its construction. The filtered signal is supplied to the control device 122. The control device 122 identifies an amplitude of the filtered signal at a threshold value. The control device 122 switches the fan motor 120 on when the filtered signal exceeds the threshold value. The control device 122 switches off the fan motor 120 when the filtered signal falls below the threshold value or drops to zero. In one embodiment, the control device 122 activates the timer 123 when the signal drops below the threshold value. The timer 123 delays the shutoff of the fan motor 120.

A further embodiment includes a receiver coil 127. The receiver coil 127 is arranged in the housing 21 in such a manner that the receiver coil 127 is close to the drive motor 5 when the vacuum device 20 is attached to the percussion drill 1. One axis of the receiver coil 127 is also parallel to the axis of rotation of the drive motor 5. The varying field of the drive motor 5 induces a current in the receiver coil 127. The current can be fed to the high-pass filter 126 as a signal. The evaluation is carried out in a manner analogous to that of the signal of the Hall effect sensor 124 described above. The current induced in the receiver coil 127 is sufficient to activate the electronic circuit of the control device 122. For example, the current can actuate a switch 128 which couples the control device 122 to a power supply 129, particularly to a battery panel. The switch 128 is designed as a bistable relay. When the fan motor 120 is deactivated, the relay is reset.

Figure 10:
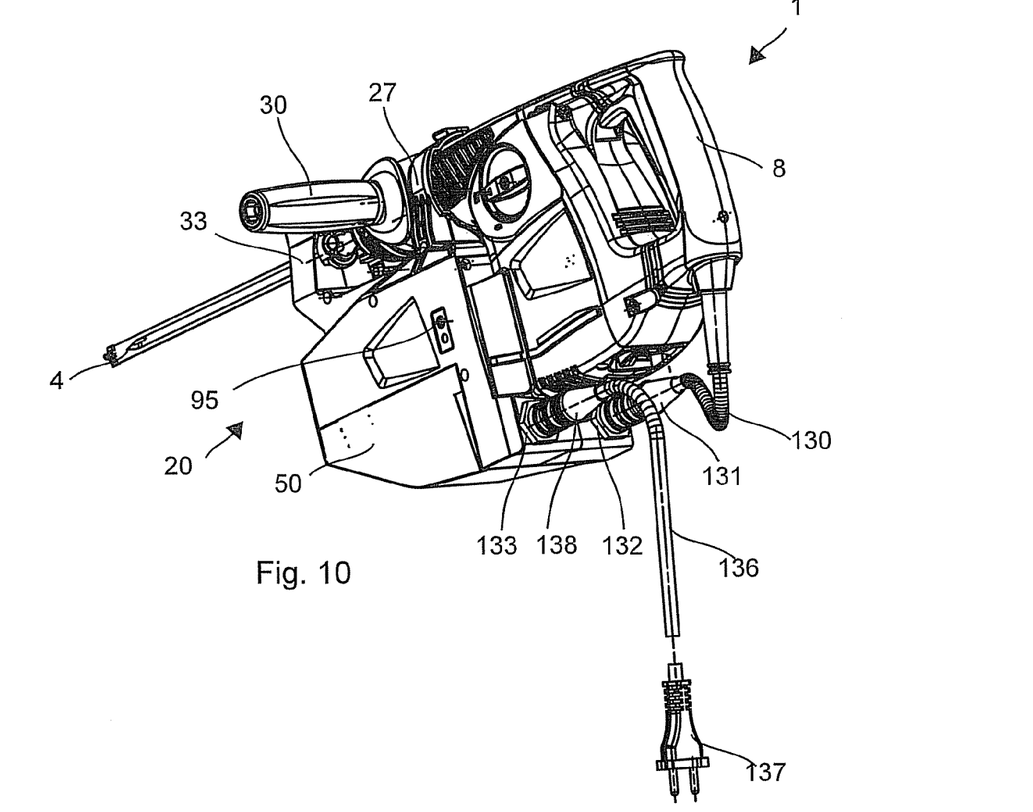
FIG. 10 and FIG. 11 show a power supply line which can be plugged in, in perspective and cutaway views.
Figure 11:
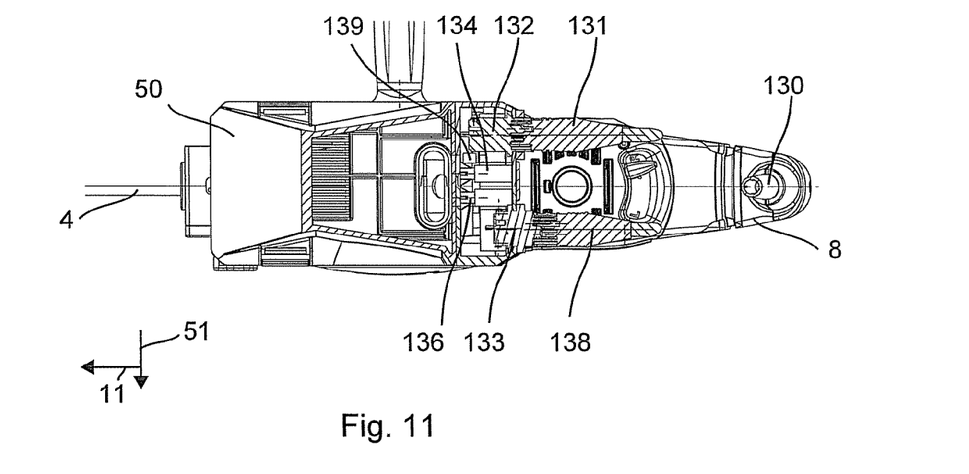
Figure 12:
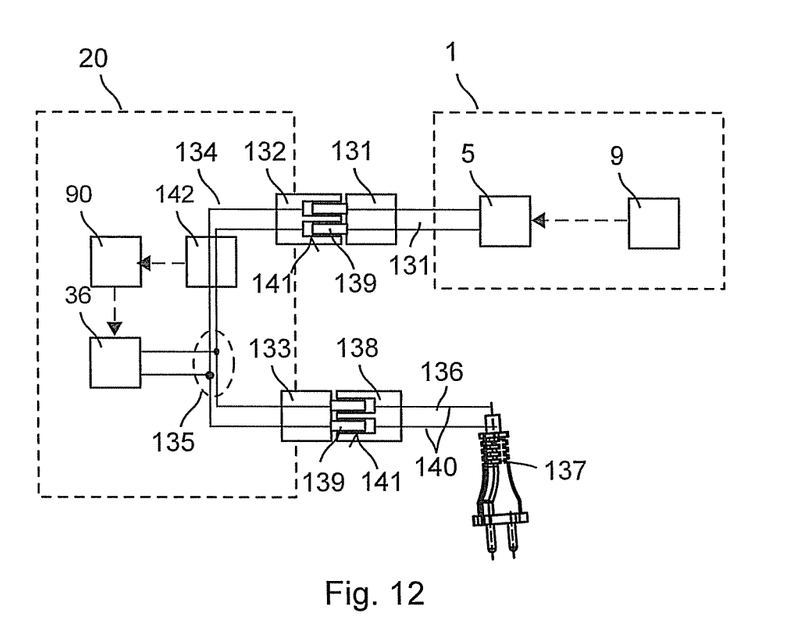
FIG. 12 shows a block diagram of the power supply line.

The supply of power for the percussion drill 1 and the vacuum device 20 is realized via a common power grid connection 129 (see, e.g. FIG. 9), for example. With further reference to FIGS. 10-12, some embodiments of the percussion drill have a short connection cable 130 which is permanently attached and hardwired on one end inside the percussion drill 1. Another end of the connection cable 130 is accessible outside the percussion drill 1 and includes a plug 131. In some embodiments, the connection cable 130 has a length of less than 20 centimeters. A socket 132 is included on the vacuum device 20 which is complementary to the plug 131 of the percussion drill 1. The short connection cable 130 can be connected electrically to the vacuum device 20 by means of the plug 131. An electrical conductor 134 inside the vacuum device 20 connects the socket 132 to the plug 133. A tap 135 on the electrical conductor 134 supplies current to the blower 36 and other electric components. A power cord 136 has a plug 137 on one end thereof according to the relevant country's domestic electrical outlets. On the other end, a socket 138 is attached which is identical to the socket 132. A user can selectively connect the power cord 136 to the short connection cable 130 in the event that the use of the vacuum device 20 is not desired. Otherwise, the user can connect the power cord 136 to the vacuum device 20 and the percussion drill 1 by means of the short connection cable 130 in order to supply current to both devices. In some embodiments, the power cord 136 has a length on the order of at least 1.5 meters.

In some embodiments, the plugs 131, 133 have projecting, pin-like electrical contacts 139 which are connected to the wire strands 140 carrying current. In the case of single-phase power, the plugs have two pin-like electrical contacts 139 for the phase line and the neutral line. In addition, a further contact can be included for the protective grounding line. The sockets 132, 138 have two sheath-like contacts 141, and the pin-like contacts 139 of the plug 131, 138 are inserted into the same. The sheath-like contacts 141 may be electrically insulated or otherwise constructed to prevent them from being touched from the outside.

The socket 132 and the plug 133 are attached on the housing 21 of the vacuum device 20 in a manner which makes them freely accessible. In some embodiments, the socket 132 and the plug 133 are positioned in a lower region on the rear side 23, for example, which is not included on the percussion drill 1 as a contact surface. The user can detach or connect the electrical plug connection independently of whether the vacuum device 20 is attached to the percussion drill 1.

A current sensor 142 can detect the flow of current through the electrical conductor 134. For example, the current sensor 142 can include a voltage sensor which measures the voltage drop between the plug 133 and the socket 132 of the vacuum device 20. If the user starts up the percussion drill 1, the current flow increases. The control device 90 taps the signal of the current sensor 142 and automatically switches on the blower 36 when the current flow exceeds a threshold value.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A vacuum device for a hand tool, comprising:
   a housing;
   a connection piece configured to mate with a hand tool;
   a collecting vessel having a tray cartridge which can be removed from the housing, wherein the tray cartridge includes a tray basin and a pivotable lid which closes the tray basin in the direction opposite a removal direction;
   a blower configured to convey dust-laden air from the connection piece into the collecting vessel; and
   a locking bar pivotally connected to either the tray cartridge or the housing for movement between a locking position and an unlocked position, wherein the locking bar, when in the locking position, presses the tray cartridge against the housing to provide pretensioning.

2. The vacuum device of according to claim 1, wherein the locking bar, when in the locking position, exerts a compression force on the tray cartridge in the direction toward the housing.

3. The vacuum device of claim 1, wherein the lid is curved in the direction opposite the removal direction, and at least partially defines the volume inside the collecting vessel.

4. A vacuum device for a hand tool, comprising:
   a housing;
   a connection piece configured to mate with a hand tool;
   a collecting vessel having a tray cartridge which can be removed from the housing;
   a blower configured to convey dust-laden air from the connection piece into the collecting vessel;
   a locking bar pivotally connected to either the tray cartridge or the housing for movement between a locking position and an unlocked position, wherein the locking bar, when in the locking position, presses the tray cartridge against the housing to provide pretensioning; and
   a seal between the housing and the tray cartridge, wherein the seal comprises two seal rings which are displaced with respect to each other along an air stream through the tray cartridge, and wherein the seal rings each surround the air stream around its periphery.

5. The vacuum device of claim 1, wherein the locking bar latches when in the locking position.

6. The vacuum device of claim 1, wherein the connection piece does not move with respect to the housing of the vacuum device.

7. The vacuum device of claim 1, further comprising another locking bar configured to detachably couple the housing to a hand power tool.

8. The vacuum device of claim 1, wherein the connection piece is configured so that a hand tool can be plugged into and through the connection piece along a working axis.

9. The vacuum device of claim 1, wherein the hand tool is a drilling tool.

10. The vacuum device of claim 9, wherein the drilling tool uses hollow drill bits.

11. The vacuum device of according to claim 4, wherein the locking bar, when in the locking position, exerts a compression force on the tray cartridge in the direction toward the housing.

12. The vacuum device of claim 4, wherein the tray cartridge includes a tray basin and a pivotable lid which closes the tray basin in the direction opposite a removal direction.

13. The vacuum device of claim 12, wherein the lid is curved in the direction opposite the removal direction, and at least partially defines the volume inside the collecting vessel.

14. The vacuum device of claim 4, wherein the locking bar latches when in the locking position.

15. The vacuum device of claim 4, wherein the connection piece does not move with respect to the housing of the vacuum device.

16. The vacuum device of claim 4, further comprising another locking bar configured to detachably couple the housing to a hand power tool.

17. The vacuum device of claim 4, wherein the connection piece is configured so that a hand tool can be plugged into and through the connection piece along a working axis.

18. The vacuum device of claim 4, wherein the hand tool is a drilling tool.

19. The vacuum device of claim 18, wherein the drilling tool uses hollow drill bits.

* * * * *